April 25, 1950 P. WEATHERS 2,505,630

TURNTABLE SPEED CONTROL DEVICE

Filed Sept. 9, 1944

INVENTOR.
PAUL WEATHERS

BY C. A. Dusha

ATTORNEY

Patented Apr. 25, 1950

2,505,630

UNITED STATES PATENT OFFICE 2,505,630

TURNTABLE SPEED CONTROL DEVICE

Paul Weathers, Upper Darby, Pa., assignor to Radio Corporation of America, a corporation of Delaware Application September 9, 1944, Serial No. 553,405

8 Claims. (Cl. 274—1)

This invention relates to the recording and reproducing of sound, and applies more particularly to apparatus for such purposes in which a pickup, recording head, or other sound-translating device is adapted to cooperate with a disc record carried on a turntable.

One of the objects of the invention is to provide an improved method for varying the angular velocity of the turntable so that a constant linear velocity of the sound track relative to the sound transducer is maintained.

Another object of the invention is to provide improved sound-translating apparatus in which the sound track on a disc record has constant linear velocity relative to the transducer.

A further object of the invention is to provide improved sound-recording equipment of the type which includes a turntable for carrying a disc record and a pivoted tone arm including a pickup adapted to cooperate with the record, and in which the speed of rotation of the turntable varies as a function of the angular position of the tone arm relative to the turntable.

Another object of the invention is to provide improved sound-recording equipment of the type which includes a turntable for carrying a disc record and a recording head adapted to cooperate with the record, and in which the speed of rotation of the turntable varies as a function of the distance of the recording head from the center of rotation of the turntable.

Another object is to provide improved equipment for recording sound on disc records, or reproducing sound from such records, by the use of which more record may be compressed on a given length of sound track than has hitherto been possible with equivalent equipment of the prior art.

A further object of the invention is to provide improved sound-translating apparatus by the use of which the necessity for tone compensation, as necessitated by varying critical wave lengths when using constant angular velocity of the turntable, is obviated.

Another object of the invention is to provide improved equipment employing a light-weight pickup to reproduce sound from a disc record carried on a turntable, and in which the sound track of the record has constant linear velocity relative to the transducer.

A further object of the invention is to provide improved sound-translating apparatus including a turntable producing a minimum of speed fluctuation of the sound track.

These objects are achieved in accordance with the invention by providing an oscillator or equivalent source of alternating energy and deriving power therefrom, amplified if necessary, to drive the motor and hence the turntable. A circuit including reactive elements determines the frequency of the oscillator, and this circuit is coupled mechanically to the pickup or recording head, so that as the latter proceeds from the perimeter of the record towards its center, the resonant frequency of the oscillator is varied. This, in turn, varies the speed of the motor and thus of the turntable to correspond to the angular position of the transducing mechanism.

The invention may be better understood from a consideration of the following description of three embodiments thereof, when read in conjunction with the accompanying drawing in which.

Figure 1:
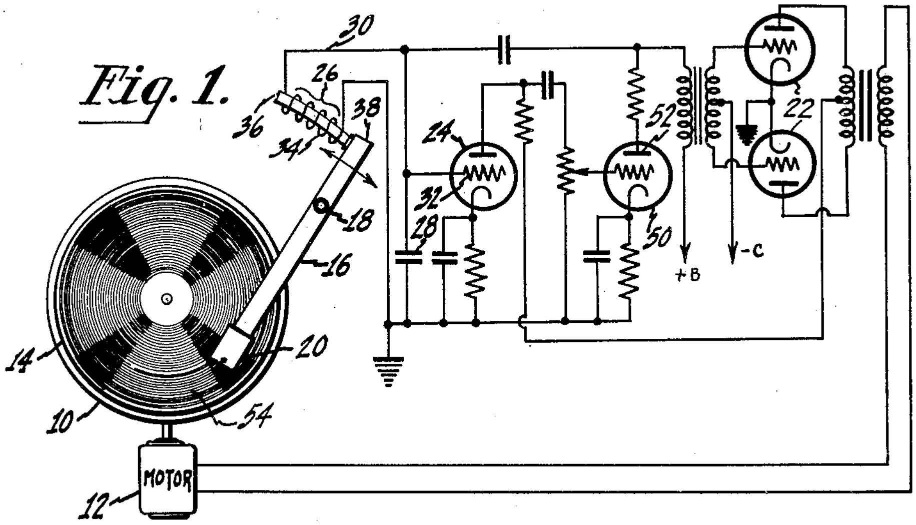
Figure 1 is a plan view of sound-reproducing equipment embodying the invention, electrical elements being shown schematically.

In Fig. 1 there is shown a turntable 10 rotated by a motor 12 and carrying a disc record 14 which bears a spiral sound track 54. A tone-arm 16, pivoted at 18, carries a pickup 20 for the reproduction of sound from the record 14. The motor is preferably of the synchronous type.

If the motor drives the turntable at a constant speed, the linear velocity of the pickup relative to the record will be greater when the pickup is adjacent the perimeter of the record than when it is nearer the center. With constant rotational speed, the amount of sound track traversed by the pickup depends on the radius of the track, and as the pickup proceeds relatively to the record from its perimeter toward the center, the linear velocity is steadily reduced.

The invention provides for the motor 12 to be driven by the power developed by an amplifier indicated at 22, and in the embodiment here illustrated the signal driving the amplifier is generated by a two-stage oscillator, comprising triodes 24 and 50. Feedback to produce oscillation occurs from the plate 52 of the triode 50 to the grid 32 of the triode 24. The resonant frequency of these oscillations is determined substantially by an inductor 26 and capacitor 28 connected in an input circuit 30 of the oscillator to the grid 32. The inductor 26 consists of a solenoid 34 and a movable, comminuted iron core 36 within it. The core is so located with respect to the remote end 38 of the tone arm 16 that as the pickup proceeds relatively to the record, and hence to the turntable, from the perimeter of the record to its center, the length of the core within the solenoid is reduced and the inductance of the inductor 26 is varied. This, in turn, alters the frequency of the oscillator. The speed of the motor, and thus of the turntable, is thereby constantly changed as the record is played, and as the angular position of the tone arm varies with respect to the record and the turntable.

Figures 2, 3:
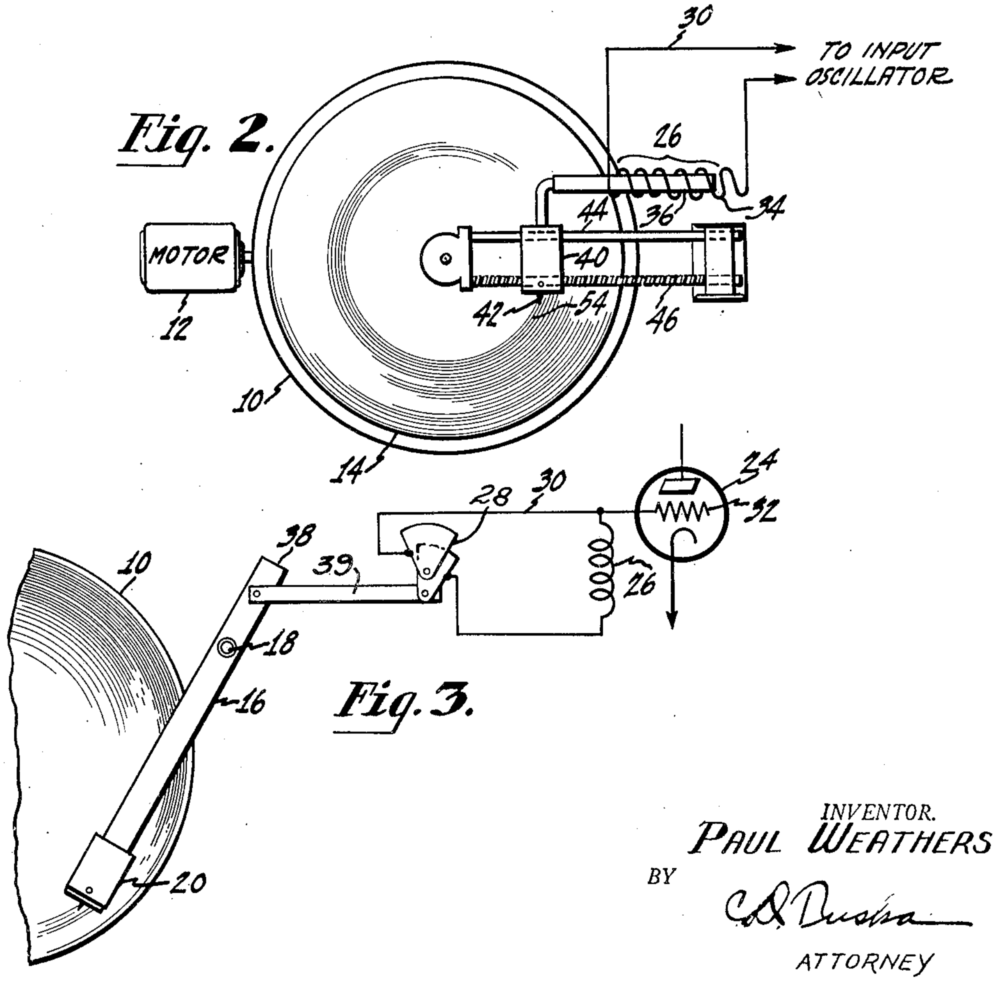
Figure 2 is a fragmentary plan view similar to Fig. 1 but of sound-recording equipment.
Figure 3 is a diagram illustrating an alternative arrangement of the equipment of Fig. 1.

Fig. 2 illustrates the application of the invention to sound-recording equipment, and shows a sound-recording head 40 which includes a cutting stylus 42 adapted to cooperate with the record 14. The recording head is carried on a support 44, including a lead screw 46, and is mechanically coupled to the iron core 36 which, together with the solenoid 34, constitutes the variable inductor 26. The latter is part of the input circuit 30 of the oscillator which is not shown in Fig. 2, but drives the motor 12 and the turntable 10 through the power amplifier 22, as in Fig. 1. As the recording head proceeds along the lead screw 46, the length of the iron core within the solenoid is varied, and the speed of the turntable varies as a function of the distance of the recording head from the center of rotation of the turntable.

It will be apparent that any variation of the reactance of the circuit 30 will affect the resonant frequency of the oscillator. In Fig. 3, the inductor 26 is shown as having fixed inductance, while the capacitor 28 is variable. It may, for example, be of the type having rotor and stator plates, with the former connected to the end 38 of the tone arm 16 by means of a linking member 39 so that as the distance of the pickup 20 to the center of rotation of the turntable is varied, and the angular position of the tone arm changes with respect to the turntable, the capacity of the element 28, and hence the frequency of the oscillator, will vary accordingly. As a further alternative, the circuit 30 may include, in addition to inductance and capacitance, a variable resistor mechanically coupled to the transducer; variation of this resistance, as already described, will vary the phase angle of current flowing in the circuit, and therefore the frequency of the oscillator.

The circuit is so arranged as to increase the speed of the motor steadily as the pickup or recording head proceeds from the perimeter of the record to its center, and this compensates for the reduction in linear velocity and maintains the linear velocity constant. When records are made and played from the center outwards, the circuit is arranged to cause a steady decrease in the speed of rotation of the turntable and thereby to compensate for the increase in linear velocity which would otherwise have resulted. In either case, the steady acceleration or deceleration of rotation serves to reduce fluctuations of speed.

Other variations within the spirit of the invention will suggest themselves to those skilled in the art. For example, in the place of the oscillator of the embodiment illustrated in Fig. 1, two oscillators may be arranged to beat against each other. One of these may be crystal-controlled or otherwise regulated to be of fixed frequency, while the frequency of the other is varied as before described for the oscillator constituted by the triodes 24 and 50. The normal beat frequency may then be the desired speed of rotation of the turntable when the transducer is in the center of the sound track; that is to say, halfway between the rim of the record and its center, say 60 or 120 cycles per second.

In a device constructed in accordance with the invention, a two-stage feedback oscillator, as shown in Fig. 1, was employed, and its frequency was varied from 30 to 180 cycles per second. A 6:1 change of speed was thus obtained, which enabled the linear velocity of a spirally recorded sound track varying in diameter from 18 inches to 3 inches to be maintained constant relative to the pickup.

There has thus been described a turntable for carrying a disc record in sound-translating apparatus, in which the linear velocity of the sound track of the record relative to a sound-translating device is maintained constant by means governed automatically by the distance of the sound-translating device from the center of rotation of the turntable. The necessity for compensating for the tone and volume of the sound recorded or reproduced is thereby obviated, as is also complicated and unsatisfactory mechanical regulation of the speed. By the use of the method and means described, a light-weight pickup may be employed, and fluctuations of linear velocity of the sound track are reduced. The speed of rotation of the turntable corresponds to the position of the transducer on the record.

I claim as my invention:

1. In sound-translating apparatus of the type which includes a turntable for carrying a disc record, a motor for rotating the turntable, and a transducer adapted to cooperate with the record, the combination of an oscillator for driving said motor and of means dependent on the distance of the transducer from the center of rotation of the turntable for varying the resonant frequency of said oscillator.

2. In sound-translating apparatus of the type which includes a turntable for carrying a disc record, a motor for rotating the turntable, and a transducer adapted to cooperate with the record, the combination of an oscillator, means for amplifying the energy generated by said oscillator, means for utilizing said amplified energy to drive said motor, and means dependent on the distance of the transducer from the center of rotation of the turntable for varying the resonant frequency of said oscillator.

3. In sound-translating apparatus of the type which includes a turntable for carrying a disc record, a motor for rotating the turntable, and a transducer adapted to cooperate with the record, the combination of a source of alternating energy for driving the motor and having an input circuit including inductance the value of which determines the output frequency of the source, and of means dependent on the distance of the transducer from the center of rotation of the turntable for varying said inductance.

4. In sound-translating apparatus of the type which includes a turntable for carrying a disc record, a motor for rotating the turntable, and a transducer adapted to cooperate with the record, the combination of a source of alternating energy for driving the motor and having an input circuit including an inductor with a movable iron core, the relative position of which with respect to the inductor determines the output frequency of the source, and of means dependent on the distance of the transducer from the center of rotation of the turntable for varying the length of the core within the inductor.

5. In sound-translating apparatus, the combination, with a turntable for carrying a disc record, a motor for rotating the turntable, and a transducer adapted to cooperate with the record, of a source of alternating energy for driving the motor and having an input circuit including an inductor with a movable, iron core, the relative position of which with respect to the inductor determines the output frequency of the source, said core being so located with respect to the transducer that its length within the inductor varies as a function of the distance of the transducer from the center of rotation of the turntable.

6. In sound-translating apparatus of the type which includes a turntable for carrying a disc record, a motor for rotating the turntable, and a transducer adapted to cooperate with the record, the combination of a source of alternating energy for driving the motor and having an input circuit including capacitance, the value of which determines the output frequency of the source, and of means dependent on the distance of the transducer from the center of rotation of the turntable for varying said capacitance.

7. In sound-translating apparatus of the type which includes a turntable for carrying a disc record, a motor for rotating the turntable, and a transducer adapted to cooperate with the record, the combination of a source of alternating energy for driving the motor and having an input circuit including a variable capacitor having rotor and stator plates, the relative position of which determines the output frequency of the source, and of means mechanically coupled to the transducer and the rotor plates for varying the respective positions of the rotor and stator plates as a function of the distance of the transducer from the center of rotation of the turntable.

8. An apparatus according to claim 1 in which said means for varying the resonant frequency of said oscillator comprises a variable reactance.

PAUL WEATHERS.

REFERENCES CITED

The following references are of record in the file of this patent:

UNITED STATES PATENTS

| Number | Name | Date |
| --- | --- | --- |
| 1,212,692 | Ruckgaber | Jan. 16, 1917 |
| 2,113,226 | Young | Apr. 5, 1938 |
| 2,328,515 | Van Overeem | Aug. 31, 1943 |
| 2,405,526 | Sinnett | Aug. 6, 1946 |

FOREIGN PATENTS

| Number | Country | Date |
| --- | --- | --- |
| 347,094 | Germany | Jan. 22, 1919 |